Jan. 1, 1963

D. H. LARSON 3,071,197

HEADLAND CORRUGATOR

Filed Dec. 23, 1958

Dale H. Larson
INVENTOR.

BY

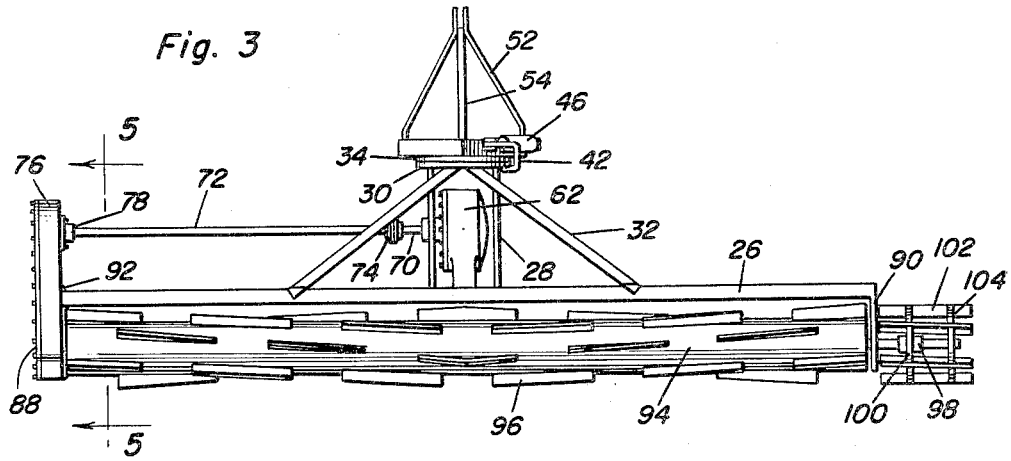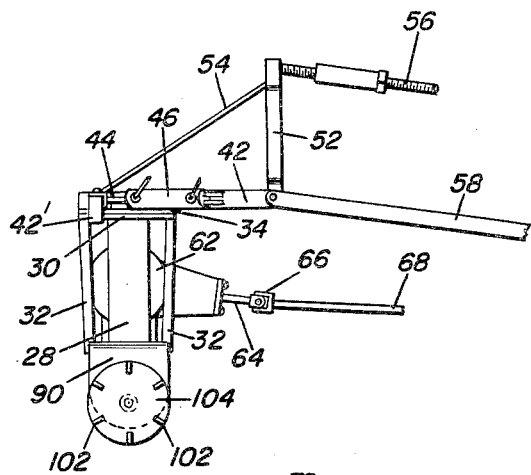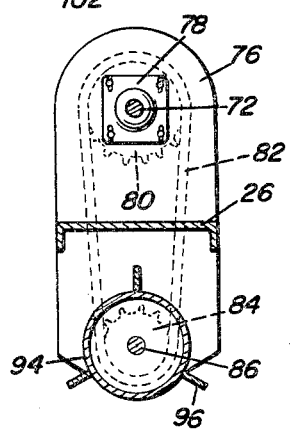

United States Patent Office 3,071,197
Patented Jan. 1, 1963

3,071,197
HEADLAND CORRUGATOR
Dale H. Larson, Othello, Wash.; B. Frances Larson, executrix of Dale H. Larson, deceased
Filed Dec. 23, 1958, Ser. No. 782,558
4 Claims. (Cl. 172—99)

The present invention generally relates to a device for digging a trench in the soil and more particularly to a device for corrugating or forming ditches in headland.

In irrigation procedures, the head ditch which extends across one end of a field or a crop is connected with a series of parallel crop ditches or corrugations. In forming the corrugations, the corrugating shovels are mounted on the rear tool bar of the tractor. When turning the tractor around, a space of ten to twelve feet is left at the head of the field which is not provided with the corrugations. To complete the corrugate, it has been the usual practice to hand shovel this last ten to twelve feet which is of course time consuming and requires considerable effort. The area between the crop and the head ditch is generally known as headland and it is the primary object of the present invention to provide a tractor attachment which will effectively corrugate the headland and save the time and labor necessary in shoveling out the headland by hand.

The present invention generally is in the form of an attachment for the conventional farm tractor having the usual power lift with the attachment being disposed to the rear of the tractor and extending generally perpendicularly thereto. The tractor is then driven parallel to the head ditch and the attachment is lowered at each corrugation and the corrugator then rotates and digs out the corrugate up to the head ditch with this process being repeated at each corrugation until the job is done. After the corrugations are formed in the headland, the usual siphon or other mechanisms are employed for conveying the water from the head ditch into the corrugations and then down into the crop in the usual manner.

Another object of the present invention is to provide a headland corrugator which is driven from the power take-off of a conventional farm tractor and is raised and lowered by the usual lift system provided thereon with parts of the driving mechanism running in oil for reducing wear with one end of the corrugator being open to enable the operator to cut the corrugate immediately next to the head ditch for easy placement of the siphon tube.

A further important feature of the present invention is to provide a headland corrugator with a swivel mount to the tractor lift system and means for angulating the longitudinal axis of the corrugator so that the corrugator may be disposed in the optimum position even though the tractor may be angulated in relation to the head ditch.

Another important object of the present invention is to provide a headland corrugator which is simple in operation, easy to use, effective for its particular purposes, easy to attach to various types of farm tractors having a power take-off and power lift system and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a rear elevational view of the headland corrugator illustrating the orientation of the digging elements on the rotatable tube and the extension thereon together with the drive mechanism;

FIGURE 4 is a side elevation of the construction of FIGURE 3 taken from the extension end thereof and illustrating the construction in which the swivel bolster is pivoted about a vertical axis; and FIGURE 5 is a sectional view taken substantially upon plane passing along section line 5—5 of FIGURE 3.

Figure 1:
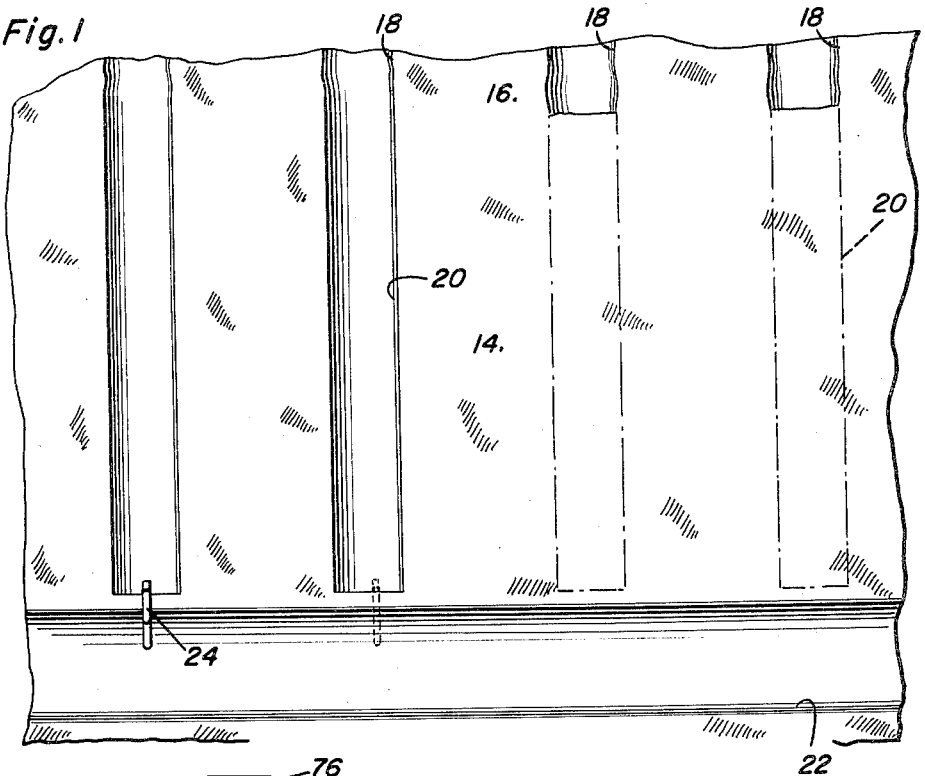
FIGURE 1 is a general plan view of a field illustrating the head ditch and corrugations with two of the headland corrugations being completed with two other headland corrugations shown in dotted lines.

Referring now specifically to the drawings, the numeral 10 generally designates the headland corrugator of the present invention which is attached to a conventional farm tractor generally designated by the numeral 12. As illustrated in FIGURE 1, headland 14 and the crop 16 is illustrated with the crop 16 having corrugates 18 or ditches formed therein and with the headland being shown with two headland corrugations 20 formed therein. On the right hand portion of FIGURE 1, two dotted line headland corrugations 20 are shown and this illustrates the distance and problem of completing the corrugations to a point adjacent the head ditch 22. After the corrugations 20 are completed through the headland 14, the usual siphon tubes 24 are employed for conveying water from the head ditch 22 into the headland corrugation 20 and then into the corrugations 18 extending through the crop which corrugations 18 are formed by a conventional corrugating shovel attached to a tractor with the headland 14 being that space between the head ditch 22 and corrugations 18 in which the tractor is turned around when forming the corrugations and when planting or otherwise cultivating the soil.

The headland corrugator 10 generally includes a transversely elongated beam or frame member 26 which is of inverted channel shaped construction. At the center of the frame member 26 is a pair of upstanding support plates 28 having a circular plate 30 rigid with the upper end thereof. The circular plate 30 is braced by a plurality of downwardly and outwardly inclined braces 32 which are rigidly attached to the side edges of the frame member 26 in spaced relation to the point of attachment of the vertical supporting plates 28.

Figure 2:
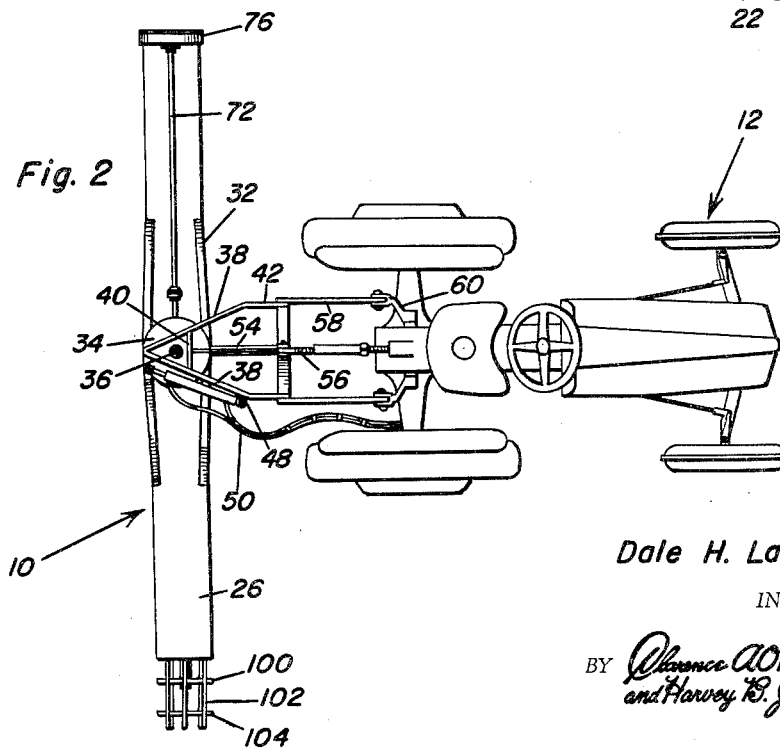
FIGURE 2 is a plan view of the headland corrugator of the present invention including the tractor to which the same is attached.

Rotatably mounted on the circular plate 30 is a similar circular plate 34 which is rotatably secured thereto by a vertical bolt or pivot pin 36. Rigidly attached to the upper surface of the plate 34 is a plurality of bracket members 38 which are reinforced by a transverse reinforcement 40 with the bracket members 38 and the reinforcement 40 generally defining a triangular shape as illustrated in FIGURE 2 with the bracket members 38 extending toward the tractor 12 in diverging relation with the terminal ends thereof extending forwardly in a parallel relation as indicated by the numeral 42.

The lower plate 30 is provided with a laterally and upwardly extending bracket 42' to which one end of a piston rod 44 is swivelly attached. The piston rod 44 extends into a cylinder 46 pivotally attached to a supporting lug 48 mounted on one of the brackets 38. The piston and cylinder arrangement defined by the cylinder 46 and piston rod 44 with the piston on the inner end thereof is of the double acting type and has a fluid pressure line 50 connected to each end thereof with the fluid pressure line being communicated with the hydraulic system of the tractor 12 so that the operator of the tractor 12 may admit and release fluid pressure to either end of the cylinder 46 for expanding and retracting the piston rod 44 thus causing the frame 26 to be pivoted about a vertical axis for orientating the frame 26 in a perpendicular relation to the line of travel of the tractor 12 or in angular relation thereto. In view of the elongation of the frame 26 and the general requirement of the device, the pivotal movement of the frame 26 is limited to approximately 30° on either side of perpendicular relation to the line of travel of the tractor 12.

At the forward ends of the forwardly extending members 42, there is connected an upstanding A-shaped frame assembly consisting of two upstanding bracket members 52 which converge upwardly and which are braced by a forwardly and downwardly extending brace member 54 connected to the transverse reinforcement 40 or otherwise connected to the upper plate 34. The upper end of the A-frame assembly is connected to an adjustable link 56 pivotally attached to the tractor while the forward ends of the members 42 are connected to links 58 connected with the lift levers 60 of the tractor. Thus by controlling the lift levers, the operator of the tractor may raise and lower the corrugator in relation to the ground surface for varying the elevation thereof, and for raising the same out of contact with the soil or dropping the same for digging the corrugate.

Supported on the frame 26 between the plates 28 is gear box or housing 62 which may be conveniently equivalent to an automobile differential which has a power input shaft 64 connected through a universal joint 66 to a drive shaft 68 connected with the power take-off of the tractor 12. A power output or drive shaft is provided an designated by the numeral 70 which is in perpendicular relation to the power input shaft 64 and extends above and parallel to the frame member 26. The output shaft 70 is connected to a shaft 72 through a universal joint or coupling 74 and extends into a gear and chain housing 76 with the shaft 72 being supported in a bearing 78 which may be adjustable to take up chain wear. The end of the shaft 72 is provided with a drive sprocket gear 80 engaged with a drive sprocket chain 82 which in turn encircles the driven sprocket gear 84 adjacent the lower end of the housing 76. The driven sprocket gear 84 is rigidly moutned on the end of an elongated driven shaft 86 which extends out through the housing 76 through a suitable bearing which is fluid tight. Thus, the housing 76 may be provided with oil so that the chain and gears run in an oil bath at all times thus reducing the wear. The upper and lower ends of the housing 76 may be rounded and the outer face thereof may be provided with a removable palte 88 for purposes of repair or replacement of parts. Adjustment of the bearing 78 may effectively take up chain wear and the coupling 74 will permit variations in the relation of the output shaft 70 and the shaft 72. The shaft 86 extends longitudinally of and parallel to the frame member 26 and extends through and is journaled in a depending end plate 90 on the other end of the frame member 26. The frame member 26 is also rigid with the housing 76 being secured thereto by welding or the like 92. Thus, the housing 76 and the end plate 90 form rigid bearings for the shaft 86 and the shaft 86 has a cylindrical tube or drum 94 rigidly but detachably secured thereto by virtue of the ends of the drum 94 being closed and provided with flanges securing the same in position. The drum 94 is provided with a plurality of radially extending lugs 96 thereon which lugs are arranged in staggered relation to each other. That is, the lugs are arranged so that none of the lugs in adjacent rows will be in alignment with each other. As illustrated, each peripheral row of lugs is provided with three lugs and the lugs are in staggered relation to each other and inclined spirally.

Exteriorly of the depending end plate 90, the shaft 86 is provided with a sleeve 98 detachably mounted thereon having a circular plate 100 connected thereto with the circular plate having a plurality of longitudinally extending blades 102 rigid therewith. The blades 102 extend from a position adjacent the outer surface of the depending plate 90 to a position beyond the end of the shaft 86. Adjacent the outer end of the blade 102, they are rigidly connected with and reinforced by a circular plate 104. The blades 102 form an extension for the cylindrical tubular member 94 and the blades generally define a cylinder of the same diameter as the cylinder designed by the lugs 96.

In use, the tractor 12 is driven generally parallel to the head ditch 22 and is stopped with the corrugator 10 generally disposed with the longitudinal axis thereof forming an extension of the corrugation 18 which has already been formed. Then the operator lowers the lift mechanism of the tractor for lowering the lugs and cylindrical tube 94 itno contact with the headland 14. The power take-off of the tractor is then operated wherein the tube or drum 94 is caused to rotate so that the lugs 96 will dig and form the headland corrugation 20 thus connecting the headland corrugation 20 with the corrugation 18 which has already been formed. The extension on the end of the tube 94 formed by the blades 102 will enable the operator to cut the corrugate next to and immediately adjacent to the head ditch 22 so that siphon tubes 24 may be used in the usual manner. This device saves the time and labor necessary to hand shovel the corrugation ditches and will enable the irrigation system to be more expeditiously completed. The over-all length of the corrugator may be varied depending upon the length of the headland which generally depends upon the type of tractor being used and the turning radius thereof. Further, the hitch assembly and the power take-off mechanism may be adapted for connection with various types of tractors having various types of hitch mechanisms and power take-off assemblies. Also, the piston and cylinder arrangement for pivoting the headland corrugator about a vertical axis is connected to the hydraulic system of the tractor in any suitable manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A device for completing irrigation corrugates across the headland to a point adjacent a head ditch comprising a hitch assembly adapted to be connected to a farm tractor and raised and lowered thereby, a frame member, means supporting said frame member from said hitch assembly for pivotal movement about a vertical axis, means interconnecting the frame member and the hitch assembly for adjusting the frame member about the vertical axis and maintaining the same in adjusted position, an elongated cylindrical member having a continuous peripheral surface journaled at each end on said frame member in horizontal position and adapted to extend at least to both sides of a tractor, a plurality of radially projecting lugs on said cylindrical member with the lugs being disposed in peripheral rows with the lugs being staggered and with the ends overlapping each other, means for driving said cylindrical member from the power take-off of a farm tractor, and an extension mounted on said cylindrical member exteriorly of the frame for completing the corrugate to a point immediately adjacent the head ditch, the space between the extension and the cylindrical member being small in comparison with the length of the extension, said extension including a plurality of spaced, parallel blades, a pair of circular, coaxial supporting plates for the blades affixed thereto, and means on one end of the cylindrical member for mounting and driving said blades about the same longitudinal axis.

2. A device for completing irrigation corrugates across the headland to a point adjacent a head ditch comprising a hitch assembly adapted to be connected to a farm tractor and raised and lowered thereby, a frame member, a first means supporting said frame member from said hitch assembly for pivotal movement about a vertical axis, a second means interconnecting the frame member and the hitch assembly for adjusting the frame member about the vertical axis and maintaining the same in adjusted position, an elongated cylindrical member having a continuous peripheral surface journaled at each end on said frame member in horizontal position and adapted to extend at least to both sides of a tractor, a plurality of radially projecting lugs on said cylindrical member with the lugs being disposed in peripheral rows with the lugs being staggered and with the ends overlapping each other, means for driving said cylindrical member from the power take-off of a farm tractor, and an extension mounted on said cylindrical member exteriorly of the frame for completing the corrugate to a point immediately adjacent the head ditch, the space between the extension and the cylindrical member being small in comparison with the length of the extension, said extension including a plurality of spaced, parallel blades, a pair of circular, coaxial supporting plates for the blades affixed thereto, and means on one end of the cylindrical member for mounting and driving said blades about the same longitudinal axis, said means for supporting the frame from the hitch assembly for rotation about a vertical axis including a pair of circular plates forming a turntable with one of the plates being rigid with the frame member and the other of the plates being rigid with the hitch assembly, said second means comprising a hydraulic piston and cylinder arrangement interconnecting the plate rigid with the frame member and the hitch assembly for extension and retraction thereby pivoting the plate and frame member about a vertical axis.

3. For use on a tractor of the type comprising a power lift and a power take-off on its rear end, a headland corrugator comprising a horizontal, transversely elongated rigid frame member, means on an intermediate portion of said frame member for swivelly mounting same for swinging adjustment in a horizontal plane on a tractor hitch power lift, a vertically elongated housing secured, at an intermediate point, on one end of the frame member, a hanger depending from the other end of the frame member, a bearing on the upper portion of the housing, a driven shaft having its end portions journaled in the lower portion of the housing and the hanger below the frame member and in spaced parallelism therewith, a drum comprising digging elements on said driven shaft, an upstanding gear box fixed on said intermediate portion of the frame member, a drive shaft over the frame member in parallelism therewith and having one end operatively connected to the gear box for actuation thereby and its other end portion journaled in the bearing, a chain and sprocket drive in the housing operatively connecting the drive shaft to the driven shaft for rotating the drum, and a power input shaft operatively connected to the gear box for connecting same to a tractor power take-off.

4. A headland corrugator in accordance with claim 3, said bearing being vertically adjustable on the housing and said drive shaft having interposed therein a universal joint whereby said chain and sprocket drive may be adjusted.

References Cited in the file of this patent

UNITED STATES PATENTS

| | | |
|---|---|---|
| 1,336,657 | Schmidt | Apr. 13, 1920 |
| 1,482,904 | Moore et al. | Feb. 5, 1924 |
| 1,566,471 | Fretts | Dec. 22, 1925 |
| 1,808,984 | Heinmiller | June 9, 1931 |
| 1,836,666 | Katzfey | Dec. 15, 1931 |
| 2,561,032 | Onfrey | July 17, 1951 |
| 2,761,369 | Chattin | Sept. 4, 1956 |
| 2,868,305 | Surratt | Jan. 13, 1959 |
| 2,870,850 | Dethlefsen | Jan. 27, 1959 |
| 2,944,612 | Rood et al. | July 12, 1960 |

FOREIGN PATENTS

| | | |
|---|---|---|
| 789,106 | Great Britain | Jan. 15, 1958 |
| 325,745 | Switzerland | Jan. 15, 1958 |